Sept. 20, 1932.  C. M. LAFFOON  1,877,904
ROTOR VENTILATION FOR TURBO GENERATORS
Filed Aug. 14, 1929  3 Sheets-Sheet 2

INVENTOR
Carthrae M. Laffoon.
BY
Wesley G. Carr
ATTORNEY

Sept. 20, 1932.   C. M. LAFFOON   1,877,904
ROTOR VENTILATION FOR TURBO GENERATORS
Filed Aug. 14, 1929   3 Sheets-Sheet 3

INVENTOR
Carthrae M. Laffoon.
BY
ATTORNEY

Patented Sept. 20, 1932

1,877,904

UNITED STATES PATENT OFFICE

CARTHRAE M. LAFFOON, OF IRWIN, PENNSYLVANIA, ASSIGNOR TO WESTINGHOUSE ELECTRIC & MANUFACTURING COMPANY, A CORPORATION OF PENNSYLVANIA

ROTOR VENTILATION FOR TURBO GENERATORS

Application filed August 14, 1929. Serial No. 385,785.

My invention relates to turbo generators and, more particularly, to the ventilation of rotors therefor.

Turbo-generators are characterized by small diameters and great lengths, with small air gaps, rendering the ventilating problem particularly difficult.

Heretofore, it has been common practice to ventilate the rotors of turbo generators by forcing the cooling medium into the rotors through longitudinal ducts or passages located beneath the main slots which carry the coils and discharging it from the rotor body through radial ducts. In the case of both solid-piece rotors and built-up-plate rotors, it has been necessary to utilize steel-slot cells for protecting the mica-slot cells or insulating folia of the coils from mechanical injury by reason of the high velocity of air passing through the ducts. The steel-slot cell occupies an appreciable portion of the slot space and also introduces an air-gap or contact resistance to the heat flow from the field copper to the rotor iron.

It is an object of my invention to obviate the above-mentioned difficulties by an improved ventilating system and structure, wherein the temperature difference between the copper and the rotor iron is reduced, and wherein the rotor teeth are provided with radial ventilating ducts which are not open to the sides of the slots.

By the utilization of my new arrangement for ventilating the rotor, I am enabled to use so much more copper, in the space heretofore occupied by the slot liners, and I so improve the thermal relationships, by omitting the extra layer of dead air heretofore introduced by said slot liners, that the ampere-turn rating of the rotor field member of a turbo-generator is increased as much as 25%, and this is all done without any substantial increase in the cost of manufacture.

A better understanding of my invention may be had by reading the following detailed description, taken in connection with the accompanying drawings, in which Figure 1 is a longitudinal sectional view of a dynamo-electric machine, showing my preferred form of rotor construction, the section plane being indicated approximately by the line I—I in Fig. 2;

Figure 1:
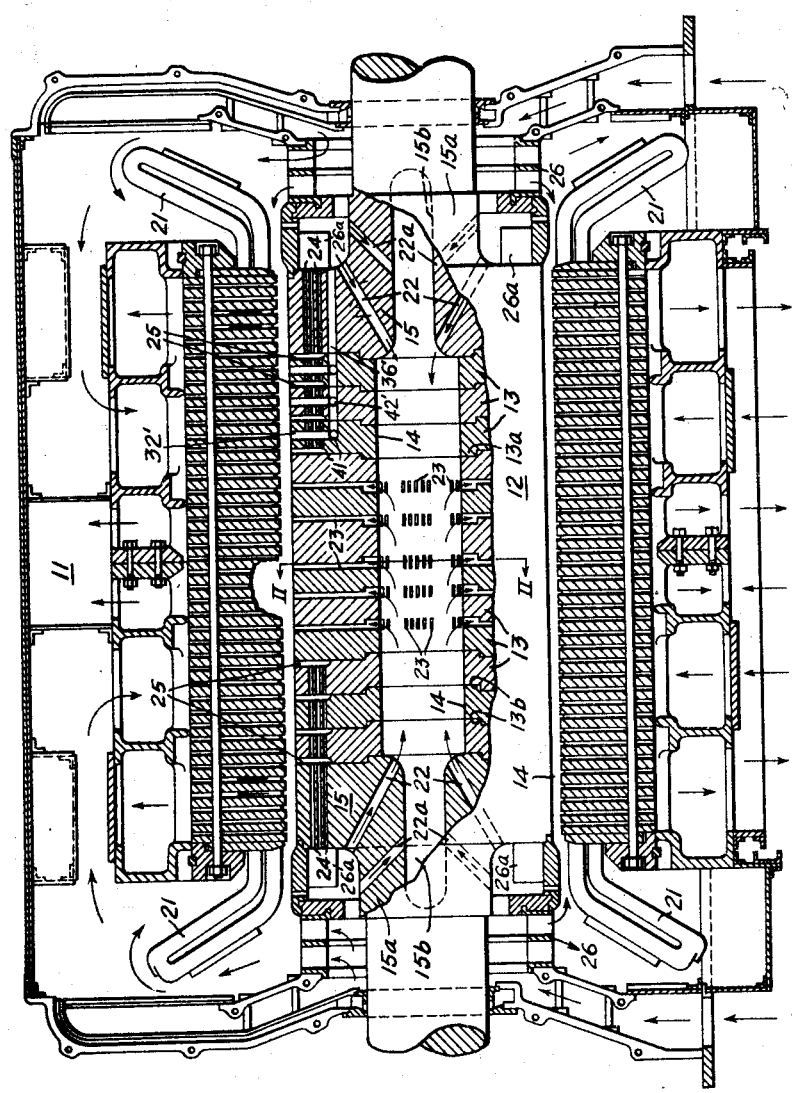

In Fig. 1, is illustrated a dynamo-electric machine having a stator 11 and a hollow rotor 12 constructed in accordance with a preferred form of my invention. The rotor comprises a plurality of annular discs 13, thus providing a large cylindrical hole 14 in the center; a pair of end plates 15 which are somewhat thicker than the respective annular discs, each of said end plates having an axially-extending shaft projection 15a; and the usual bolts 16 (Fig. 2), which are disposed in bolt-holes 17 for holding said discs in fixed axial relation between the two end plates 15. The discs and end plates have interneting annular bosses 13a and recesses 13b for accurately centering said discs and plates with respect to each other and providing a spigot joint connection between adjacent plates for maintaining the discs in proper alignment.

Figure 2:
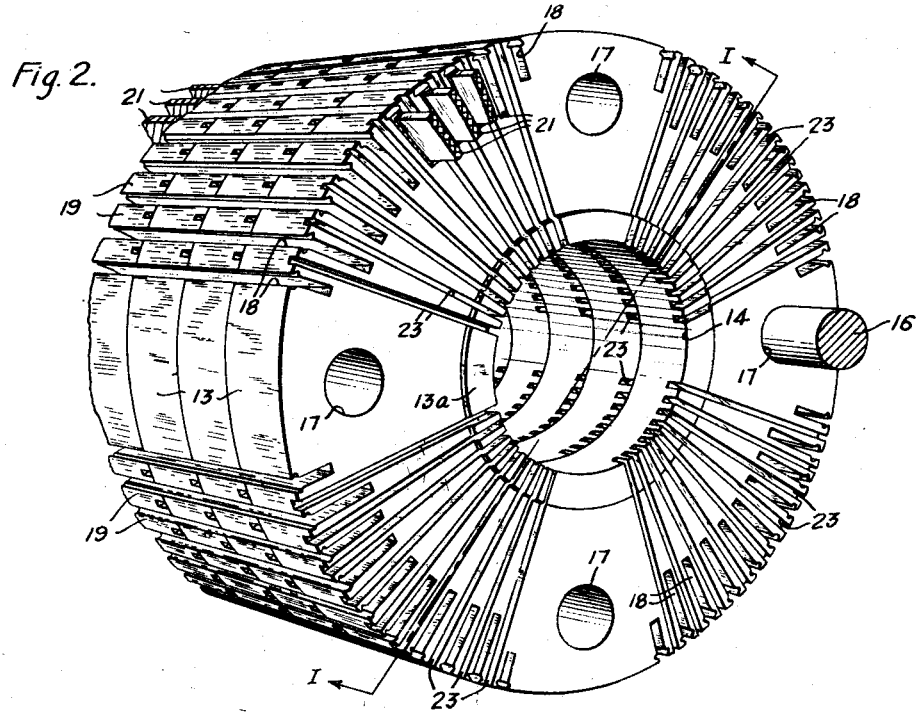
Fig. 2 is a perspective view showing a detail of my preferred hollow rotor, as viewed from a section-plane approximately indicated by the line II—II in Fig. 1.

The portions of the rotor periphery lying between the bolt-holes 17 are provided with coil-slots 18 separated by teeth 19. The coil-slots 18 carry the direct-current field windings 21 of the turbo-generator, as indicated in Fig. 2, the winding conductors being covered by a suitable insulation.

Ventilating air is led into the central hollow space 14 in the rotor by means of inclined ducts 22 in each of the end plates 15. In the particular machine shown in Figs. 1 and 2, the air is expelled from the central hollow space 14 by means of radially-extending ventilating ducts or grooves 23 which are cut in the side faces of the five centrally disposed discs or plates 13 of which the rotor is constructed. It is an important feature of my invention that these radial ventilating ducts 23 are cut through the centers of the teeth 19 between the coil-slots 18, so that a thin portion of the tooth material is disposed between each radial ventilating duct 23 and each coil-slot 18, thereby preventing the blast of ventilating air from blowing directly on the sides of the coil-slots 18, avoiding the necessity for slot liners, and providing the best possible facilities for heat interchange between the cooling air in the radial ducts 23 and the field-winding conductors 21 lying in the slots 18.

In order to make it possible to provide a larger number of ventilating ducts 22 in the end plates 15, each end plate is provided with a hollow chamber 15b extending back into the shaft projecting portion 15a, into which air entering from an outer circumferential row of ducts 22a is passed before passing to the central hollow space 14.

The amount of air which can be passed through the intake ducts 22 and 22a in the end plates is somewhat limited, and, in the case of long rotors, it is impracticable to supply sufficient air to ventilate the entire rotor from this source. Also, some additional means is necessary for cooling the ends of the rotor.

In extremely long rotors, as shown in Fig. 1, I, therefore, provide separate means for ventilating those of the discs or plates 13, of the plate-rotor construction, which lie nearest the end plates 15 of the rotor. Ventilating air is supplied to the end discs 13 by means of a large number of longitudinally-extending holes 24 which are bored into the rotor from each end, so as to pass through the center-lines of the rotor-teeth 19. The axial holes or ducts 24 communicate with short radial ducts or grooves 25 which are cut in the side faces of these end discs 13 through the center-lines of the teeth 19, so as to conduct the ventilating air outwardly through the teeth 19 to the air-gap of the generator.

The ventilating air for the entire generator is supplied from the bottom of the machine, at each end, as indicated by the arrows in Fig. 1, being forced into the machine by external blowers (not shown). The additional air pressure which is required for the stator ventilation is supplied by a fan 26 at each end of the rotor. The additional air pressure required to force the air through the longitudinal rotor ducts 24, which are small, as compared with the large hollow space 14, is supplied by a fan 26a at each end of the rotor, as indicated in Fig. 1.

Figure 3:
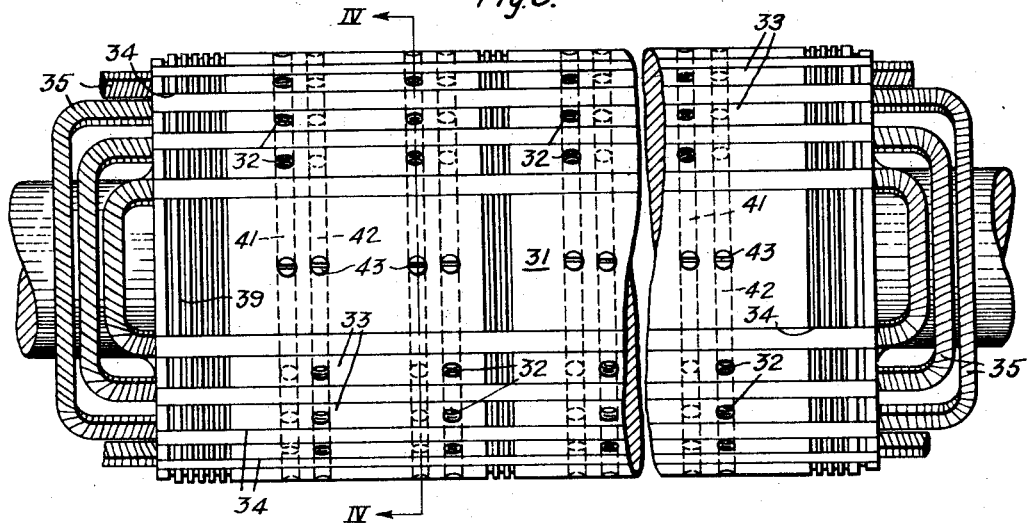
Fig. 3 is a longitudinal view showing the adaptation of my invention to a solid rotor.
Figure 4:
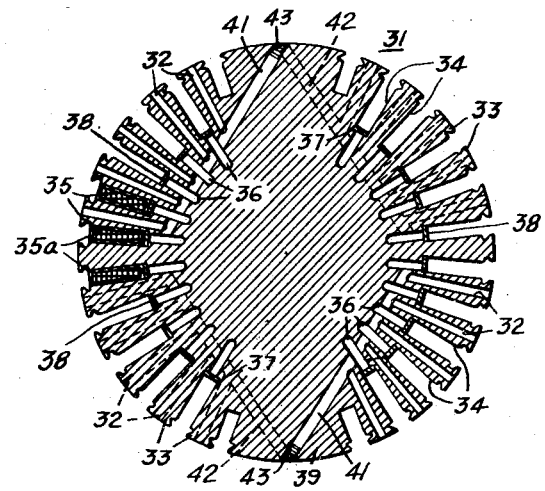
Fig. 4 is a transverse sectional view of the solid rotor illustrating more clearly the disposal of the ventilating passages with reference to solid rotors, the section plane being indicated at IV—IV in Fig. 3.

In Figs. 3 and 4, is illustrated the application of my invention to a solid or single-piece rotor 31. Radial ducts or holes 32 are provided by drilling radially into the surface of the rotor through the ends of the teeth 33 and between adjacent coil slots 34. Portions of the rotor periphery are provided with longitudinally-extending coil slots 34 in which coils 35 having insulating coverings 35a, are embedded. Beneath the coil slots are provided axial ventilating ducts or slots 36, (Fig. 4) extending throughout the length of said coil slot.

The ventilating slots 36 are narrower than the coil slots 34, and portions of the rotor core which provide the walls of the slot, offset the walls of the main slot and thereby provide shoulders 37 on which the coil sides are supported. In order to prevent destruction to the insulation of the coils at the bottoms of the coil slots, due to the blowing of the ventilating air through the longitudinal ventilating duct 36, a single steel strip 38 is carried by the shoulder offset portions 37 of the ventilating duct. Though, in this application to a solid rotor, I have not done away with a steel liner entirely, I have considerably decreased the necessary amount of metal lining.

The radial holes are aligned in rows on the peripheral surface of the rotor body over the slotted portion of that body. Transverse or oblique holes 41 and 42 are drilled into the unslotted portion 39 of the rotor body to connect the axial ventilating ducts 36 with the adjacent radial holes 32. The holes 41 and 42 are formed by drilling from the rotor surface in a radial plane, at approximately right angles to the side walls of the ventilating ducts 36. The drill is not permitted to penetrate the rotor surface at the opposite side, but the drilling is stopped when it opens into the last of a group of five axial ventilating ducts. In Fig. 4, the holes 41 are shown in the section plane IV—IV of Fig. 3, while the holes 42 are shown dotted and in back of the section. In other words, the direction of drilling is the same at alternate points. Threaded plugs or stoppers 43 are provided for closing the holes 41 and 42 in the rotor periphery.

The cooling air enters the ducts 36 at the ends of the rotor, passing through them until it reaches the transverse holes 41 or 42, and, from these holes, it discharges from the rotor body through the radial holes 32.

This method of providing ventilating passages, as shown in Fig. 4, may be provided in my preferred form of construction (Fig. 1) and thereby provide additional cooling means for the ends of the rotor. Each of the annular discs 13 (Fig. 1) near the end of the rotor has radial holes 32', longitudinally extending holes or passages 36' and transverse passages 41' and 42' for providing substantially circumferential flow of ventilating air between the longitudinal passages 36' and the radial holes 32'. The cooling air is blown into the ends of the rotor, through longitudinal passages 36', to the circumferential passage 41' or 42' and is then discharged from the rotor through the radial holes 32'.

Figure 6:
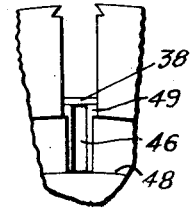
Fig. 6 is a detail view, showing a feature for decreasing the air-pressure loss through the ventilating passages of the solid-plate rotor in Fig. 5.
Figure 5:
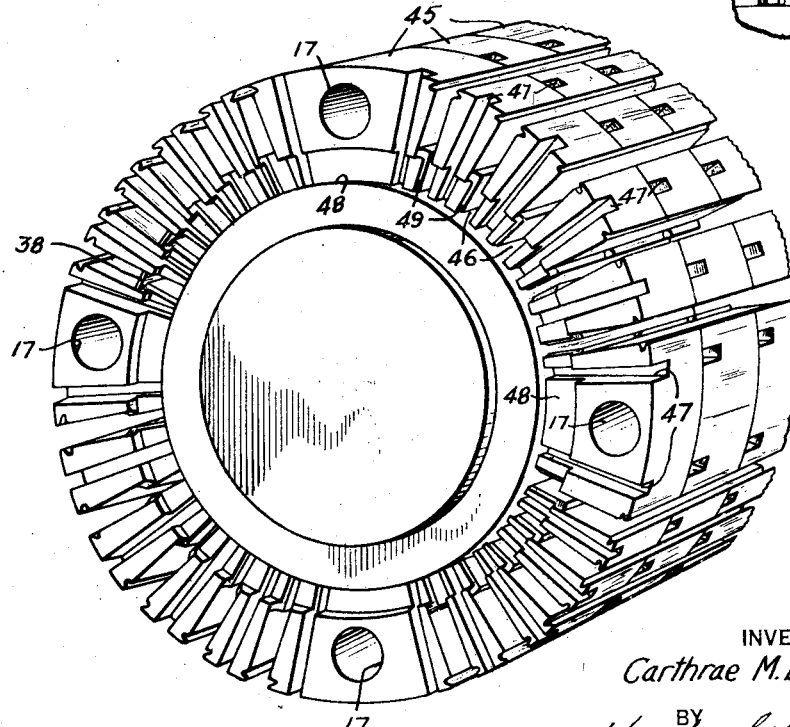
Fig. 5 is a perspective view, showing the adaptation of my ventilating system to rotors made up of solid plates and having no hollowed portion.

Figs. 5 and 6 show another form of my invention as applied to rotors made up of solid cylindrical discs 45. In the form of my invention here shown, the air is taken into the rotor through axial ventilating ducts 46 beneath the coils like the axial ducts in my solid rotor, while the radial ducts are of the form shown in the preferred modification of my invention, (Figs. 1 and 2) consisting of radial grooves 47 disposed in one face of each disc, extending only a small distance toward the center of the rotor from the disc periphery, to communicate with an annular ventilating duct 48 that is also provided in the face of the disc. The cooling air enters the rotor from each end through the longitudinal ventilating ducts 46, from which it is communicated to the radial ducts 47 by means of the annular duct 48, and, at the same time, circumferential circulation of the cooling air in the rotor is provided. The annular duct 48 may also be provided in other forms of my invention, such as that shown in Fig. 1, as an additional air-pressure-equalizing means.

In order to eliminate the air-pressure loss of cooling air in making a right-angle turn from the longitudinal ventilating duct 46 to the circumferential duct 48, a curved surface 49 is formed by drilling radially into the rotor body at the intersection of the longitudinal and circumferential ducts, as illustrated in the figures.

By the arrangements which I have set forth, it can be seen that I have also made provision whereby the passages for providing circumferential flow between the longitudinal and radial passages are removed from the bottom wall of the coil slots. The central hollow passage 14, which allows for circumferential flow as well as for longitudinal flow of the ventilation of air in Fig. 1, and the transverse holes 41 and 42 in Fig. 3, are both located in the rotor body at some distance from the bottom walls of the slot, thereby giving protection to the winding insulation 35a.

By my invention, I have eliminated the necessity for the utilization of steel-slot cells and thereby increased the amount of copper that may be used in slots of a given size, and decreased the thermal drop present heretofore between the field copper and the rotor iron, and also, at the same time, as a result, I have provided considerable improvement in the ventilation of turbo-motor bodies.

I claim as my invention:

1. In a rotor body for a turbo-generator, a rotor core comprising a plurality of discs disposed in face-to-face relation, extra thick end plates, means for holding said discs in fixed axial relation between said end plates, said rotor core having coil slots and teeth portions, insulated windings in said coil slots, said discs having radially-extending ventilating grooves disposed in the faces thereof in said teeth portions between adjacent slots but removed from the walls of said slots so that the ventilating air is kept from passing over said winding insulation, and means for supplying ventilating air to said radial grooves from the ends of the core.

2. In a rotor body for a turbo-generator, a rotor core comprising a plurality of annular plates disposed in face-to-face relation, end plates, means for holding said annular plates in fixed axial relation between said end plates, said rotor core having core slots and teeth portions, insulated windings in said core slots, said annular plates having radially-extending ventilating grooves disposed in the faces thereof and passing centrally through the teeth portions between adjacent slots but removed from the side walls of said slots so that the ventilating air is kept from passing over said winding insulation, and means for supplying ventilating air to said radial grooves without blowing directly on said winding insulation.

3. In a rotor member for a turbo-generator, a rotor core comprising a plurality of annular discs disposed in face-to-face relation, and providing a ceneral cylindrical passage, end plates disposed at each end of the said passage and having ventilating passages for admitting cooling air to said central passage, means for holding said discs in fixed axial relation between said end plates, said core having coil-slots, insulated windings in said slots, said discs having radially-extending ventilating grooves in their faces from the periphery to said central passage, said grooves passing outwardly from the central passage through the teeth between adjacent winding slots and slightly removed from the walls of said slots.

4. In a rotor body for a turbo-generator, a rotor core comprising a plurality of annular discs, end plates having shaft-projecting portions, said annular discs being disposed in face-to-face relation and providing a central ventilating passage, means for holding said discs between said end plates, said end plates being hollowed and the hollowed portions extending back into the shaft projecting portions thereof, each of said discs having a plurality of radial ventilating ducts which communicate with said central passage, and said end plates having circumferential rows of air passageways entering into said hollowed portion thereof.

5. In a rotor body for a turbo-generator, means for improving the ventilation thereof comprising a core having a central passage, means for supplying ventilating air to said passage from the ends of the rotor, means for supplying cooling air from said passage to the part of the rotor body midway of the ends of the rotor, and a separate cooling means for ventilating the end regions of the body cooled independently of said passage, the air entering said rotor body through said separate cooling means being taken into said body from the ends thereof, comprising means for providing longitudinal flow of ventilating air through the rotor, means for providing radial flow of air, and said rotor body having holes drilled from the rotor periphery for providing substantially circumferential flow of air between said longitudinal means and said radial means.

6. A rotor body for a turbo-alternator comprising a cylindrical core having groups of slots for receiving the direct-current exciting winding, said slots defining teeth therebetween, said teeth having a plurality of radial holes, extending in each of a plurality of transverse planes to a depth below said slots, said body having a plurality of longitudinal holes non-intersecting with said radial holes, and said body having a plurality of ducts in said transverse planes for connecting said longitudinal holes to the bottoms of said radial holes.

7. A rotor body for a turbo-alternator comprising a cylindrical core having groups of slots for receiving the direct-current exciting winding, said slots defining teeth therebetween, said teeth having a plurality of radial holes, extending in each of a plurality of transverse planes to a depth below said slots, said radial holes being separated from the side walls of the adjacent slots, said body having a plurality of longitudinal holes non-intersecting with said radial holes, and said body having a plurality of ducts in said transverse planes for connecting said longitudinal holes to the bottoms of said radial holes.

8. A rotor body for a turbo-alternator comprising a cylindrical core having groups of slots for receiving the direct-current exciting winding, said slots defining teeth therebetween, said teeth having a plurality of radial holes, extending in each of a plurality of transverse planes to a depth below said slots, said radial holes being separated from the side walls of the adjacent slots, said body having a plurality of longitudinal holes at a depth below said slots and non-intersecting with said radial holes, and said body having a plurality of diagonal holes drilled in each of said transverse planes from the rotor periphery for connecting said longitudinal holes to the bottoms of said radial holes.

In testimony whereof, I have hereunto subscribed my name this 6th day of August 1929.

CARTHRAE M. LAFFOON.